United States Patent
Lee

(10) Patent No.: US 11,598,846 B2
(45) Date of Patent: Mar. 7, 2023

(54) FMCW RADAR SYSTEM AND METHOD USING UP AND DOWN CHIRP SIMILARITY TO DETERMINE LENGTH OF TARGET

(71) Applicant: HL KLEMOVE CORP., Incheon (KR)

(72) Inventor: JinGu Lee, Ansan-si (KR)

(73) Assignee: HL KLEMOVE CORP., Incheon (KR)

( * ) Notice: Subject to any disclaimer, the term of this patent is extended or adjusted under 35 U.S.C. 154(b) by 384 days.

(21) Appl. No.: 16/869,846

(22) Filed: May 8, 2020

(65) Prior Publication Data

US 2020/0355793 A1    Nov. 12, 2020

(30) Foreign Application Priority Data

May 9, 2019    (KR) .................... 10-2019-0054074

(51) Int. Cl.
| | | |
|---|---|---|
| *G01S 7/41* | (2006.01) | |
| *G01S 13/89* | (2006.01) | |
| *G01S 13/50* | (2006.01) | |

(52) U.S. Cl.
CPC ............... *G01S 7/412* (2013.01); *G01S 7/41* (2013.01); *G01S 13/505* (2013.01); *G01S 13/89* (2013.01)

(58) Field of Classification Search
CPC ........ G01S 7/412; G01S 7/352; G01S 13/345; G01S 13/931; G01S 13/583; G01S 7/41; G01B 15/00

See application file for complete search history.

(56) References Cited

U.S. PATENT DOCUMENTS

| | | | | |
|---|---|---|---|---|
| 2011/0293145 A1* | 12/2011 | Nogami | ................. | G08G 1/166 382/103 |
| 2013/0207832 A1* | 8/2013 | Mizutani | ................. | G01S 13/58 342/107 |
| 2014/0184437 A1* | 7/2014 | Takabayashi | ........... | G01S 7/352 342/107 |
| 2015/0153447 A1* | 6/2015 | Lee | .......................... | G01S 13/36 342/27 |
| 2017/0146648 A1* | 5/2017 | Lim | ....................... | G01S 13/343 |
| 2021/0356558 A1* | 11/2021 | Fuchs | ..................... | G01S 7/356 |

FOREIGN PATENT DOCUMENTS

| | | |
|---|---|---|
| JP | 4980969 A | 7/2012 |
| JP | 2014002012 | 1/2014 |
| KR | 10-1312420 B1 | 9/2013 |

* cited by examiner

*Primary Examiner* — Donald H B Braswell
(74) *Attorney, Agent, or Firm* — Hauptman Ham, LLP

(57) ABSTRACT

The present disclosure relates to a vehicle radar, a vehicle radar controlling method, and a vehicle radar controlling system. Specifically, the vehicle radar includes a signal transmitter which transmits a transmission signal for detecting a target object, a signal receiver which receives a reception signal including a target signal generated by the transmission signal being reflected by the target object, and a signal processor which processes the reception signal to form a frequency spectrum of the reception signal. Specifically, the signal processor determines a window size based on the frequency spectrum of the reception signal, determines spectrum similarity between an up-chirp frequency and a down-chirp frequency based on the determined window size, and determines a length of the target object if the spectrum similarity is greater than a preset threshold value.

9 Claims, 6 Drawing Sheets

FMCW RADAR SYSTEM AND METHOD USING UP AND DOWN CHIRP SIMILARITY TO DETERMINE LENGTH OF TARGET

CROSS-REFERENCE TO RELATED APPLICATION

This application claims priority from Korean Patent Application No. 10-2019-0054074, filed on May 9, 2019, which is hereby incorporated by reference for all purposes as if fully set forth herein.

BACKGROUND

1. Field of the Invention

The present disclosure relates to a vehicle radar, a vehicle radar controlling method, and a vehicle radar controlling system, and more particularly, to a frequency modulated continuous wave (FMCW) radar for determining a length of a target object by determining validity based on frequency spectrum similarity, an FMCW radar controlling method, and an FMCW radar controlling system.

2. Discussion of Related Art

Radars are devices that detect a target object by radiating electromagnetic waves and receiving reflection waves reflected by objects present in a certain region. Vehicle radars are used to detect objects present around a vehicle and assist a driver in driving. Such vehicle radars may be implemented as various types of radars that may be mounted on the vehicle.

Recently, as interest in driver convenience and safety with respect to vehicle driving is increased, various vehicle safety and convenience technologies using such a vehicle radar have been developed. As an example, various technologies, such as smart cruise technology for detecting a front vehicle and allowing a vehicle to automatically travel to follow the detected front vehicle, automatic driving technology, and automatic emergency braking technology, have been developed.

Objects that are detected in a road driving situation by a vehicle radar are mostly vehicles. Types of vehicles detected by the vehicle radar are varied, and lengths of the vehicles are also varied according to the types of vehicles. If the length of the detected vehicle is known, the vehicle may be distinguished by a driving assistance system. Furthermore, if there is a plurality of objects and a target object is specified through a length of a vehicle, it is possible to assist in tracking the target object. Accordingly, there is a need to develop a method of effectively estimating a length of an object detected by a vehicle radar.

SUMMARY OF THE INVENTION

The present disclosure is directed to determining validity based on frequency spectrum similarity using signal characteristics of a frequency modulated continuous wave (FMCW) radar and estimating a length of a target object if it is determined to be valid.

According to an aspect of the present disclosure, there is provided a frequency modulated continuous wave (FMCW) radar including a signal transmitter which transmits a transmission signal for detecting a target object, a signal receiver which receives a reception signal including a target signal generated by the transmission signal being reflected by the target object, and a signal processor which processes the reception signal to form a frequency spectrum of the reception signal, wherein the signal processor determines a window size based on the frequency spectrum of the reception signal, determines spectrum similarity between an up-chirp frequency and a down-chirp frequency based on the determined window size, and determines a length of the target object if the spectrum similarity is greater than a preset threshold value.

According to another aspect of the present disclosure, there is provided a frequency modulated continuous wave (FMCW) radar controlling method including a signal transmitting operation of transmitting a transmission signal for detecting a target object, a signal receiving operation of receiving a reception signal including a target signal generated by the transmission signal being reflected by the target object, a frequency spectrum forming operation of processing the reception signal to form a frequency spectrum of the reception signal, a window size determining operation of determining a window size based on the frequency spectrum of the reception signal, a spectrum similarity determining operation of determining spectrum similarity between an up-chirp frequency and a down-chirp frequency based on the window size, and an object length determining operation of, if the spectrum similarity is greater than a preset threshold value, determining a length of the target object.

According to still another aspect of the present disclosure, there is provided a frequency modulated continuous wave (FMCW) radar controlling system including at least one antenna which transmits a transmission signal for detecting a target object and receives a reception signal including a target signal generated by the transmission signal being reflected by the target object, and a controller which processes at least one of the transmission signal or the reception signal, wherein the controller processes the reception signal to form a frequency spectrum of the reception signal, determines a window size based on the frequency spectrum of the reception signal, determines spectrum similarity between an up-chirp frequency and a down-chirp frequency based on the determined window size, and determines a length of the target object if the spectrum similarity is greater than a preset threshold value.

DETAILED DESCRIPTION OF EXEMPLARY EMBODIMENTS

Figure 1:
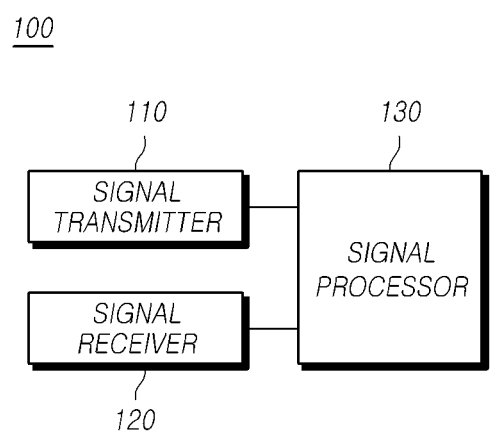
FIG. 1 is a diagram illustrating a configuration of a radar according to one embodiment of the present disclosure.

Hereinafter, some embodiments of the present disclosure will be described in detail with reference to the exemplary drawings. Terms, such as "first," "second," "A," "B," "(A)," or "(B)" may be used herein to describe elements of the disclosure. Each of these terms is not used to define the essence, order, sequence, or number of elements etc., but is used merely to distinguish the corresponding element from other elements.

When it is mentioned that a first element "is connected or coupled to," or "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to," "contact or overlap," etc. each other via a fourth element. Here, the second element may be included in at least one of two or more elements that "are connected or coupled to," "contact or overlap," etc. each other. In the present specification, a vehicle may be a concept including an automobile, a motorcycle, and the like. In addition, the vehicle may be a concept including all of an internal combustion engine vehicle including an engine as a power source, a hybrid vehicle including both an engine and an electric motor as a power source, and an electric vehicle including an electric motor as a power source. Hereinafter, descriptions will be given focusing on the automobile as the vehicle.

In the following description, the term "front" refers to a forward driving direction of a vehicle, and the term "rear" refers to a rearward driving direction of the vehicle. In addition, the term "left side" of the vehicle refers to a left side with respect to the forward driving direction of the vehicle, and the term "right side" of the vehicle refers to a right side with respect to the forward driving direction of the vehicle. In addition, the term "rear side" of the vehicle refers to a left or right side with respect to the rearward driving direction of the vehicle.

Meanwhile, a radar (or radar sensor) or radar system used in the present disclosure may include at least one vehicle radar sensor, for example, at least one of a front detection radar sensor mounted on the front of a vehicle, a rear radar sensor mounted on the rear of the vehicle, or a side or side-rear detection radar sensor mounted on each side of the vehicle. Such a radar or radar system may analyze a transmission signal and a reception signal to process data and thus detect information about an object. To this end, the radar or radar system may include an electronic control unit (ECU) or a processor. A communication link such as a suitable vehicle network bus may be used for data transmission or signal communication from the radar to the ECU.

Such a radar includes one or more transmission antennas for transmitting radar signals and one or more reception antennas for receiving reflection signals reflected from objects.

Meanwhile, the radar according to the present embodiment may adopt a multi-dimensional antenna array and a multiple-input multiple-output (MIMO) signal transmission and reception method in order to form a virtual antenna aperture that is greater than an actual antenna aperture.

For example, in order to achieve horizontal and vertical angle accuracies and resolutions, a two-dimensional antenna array is used. If the two-dimensional antenna array is used, signals are transmitted and received by separately performing (time-multiplexed) scans twice in horizontal and vertical directions, and MIMO may be used separately from (time multiplexed) two-dimensional radar horizontal and vertical scans.

More specifically, the radar according to the present embodiment may adopt a two-dimensional antenna array configuration including a transmission antenna unit including a total of 12 transmission antennas Tx and a reception antenna unit including a total of 16 reception antennas Rx. As a result, the radar may have an arrangement of a total of 192 virtual reception antennas.

In this case, the transmission antenna unit is provided with three transmission antenna groups each including four transmission antennas. A first transmission antenna group may be spaced a certain distance from a second transmission antenna group in a vertical direction, and the first or second transmission antenna group may be spaced a certain distance D from a third transmission antenna group in a horizontal direction.

In addition, the reception antenna unit may be provided with four reception antenna groups each including four reception antennas. The reception antenna groups may be disposed to be spaced apart from each other in a vertical direction, and the reception antenna unit may be disposed between the first transmission antenna group and the third transmission antenna group which are spaced apart from each other in the horizontal direction.

Furthermore, in another embodiment, antennas of the radar may be disposed in a two-dimensional antenna array. As an example, each antenna patch may have a rhombus grid arrangement, thereby reducing unnecessary side lobes.

Alternatively, the two-dimensional antenna array may include a V-shaped antenna array in which a plurality of radiation patches are disposed in a V-shape, and more specifically, may include two V-shaped antenna arrays. In this case, a single feed is performed toward an apex of each V-shaped antenna array.

Alternatively, the two-dimensional antenna array may include an X-shaped antenna array in which a plurality of radiation patches are disposed in an X-shape, and more specifically, may include two X-shaped antenna arrays. In this case, a single feed is performed toward a center of each X-shaped antenna array.

In addition, the radar according to the present embodiment may use a MIMO antenna system in order to realize vertical and horizontal detection accuracies or resolutions.

More specifically, in the MIMO system, transmission antennas may transmit signals having independent waveforms that are distinguished from each other. That is, each transmission antenna may transmit a signal having an independent waveform distinguished from those of other transmission antennas, and each reception antenna may determine which transmission antenna transmits a reflection signal reflected from an object due to different waveforms of the signals.

In addition, the radar according to the present embodiment may include a radar housing which accommodates a circuit board including the transmission and reception antennas and a circuit and include a radome which constitutes an exterior of the radar housing. In this case, the radome is made of a material capable of reducing attenuation of transmitted and received radar signals, and the radome may include a front or rear bumper, a grille, or a side body of the vehicle, or an exterior surface of a vehicle component.

That is, the radome of the radar may be disposed inside the grille, the bumper, or a body of the vehicle and may be disposed as a portion of a component constituting an exterior surface of the vehicle, such as a portion of the grille, the bumper, or the body of the vehicle, thereby improving an esthetic sense of the vehicle and providing convenience during mounting of the radar.

Recently, technology for detecting information about an object present around a vehicle using a radar has been developed as a system for assisting in driving a vehicle. Types of vehicles detected by a radar are varied, and lengths of the vehicles are also varied according to the types of vehicles. If the length of the detected vehicle is known, the vehicle may be distinguished by a driving assistance system. In particular, if there is a plurality of objects and a target object is specified through a length of a vehicle, it is possible to assist in tracking the target object.

Accordingly, various methods of estimating a length of an object detected by a radar sensor have been developed. As a conventional method of estimating length information of an object using a radar sensor, there is a method of using a range profile in a frequency domain. However, a method of estimating a length of an object using only range profile information is not easy to apply to the field of vehicle radar sensors. This is because, in an environment in which a radar is mounted on a vehicle to detect an object, unlike other environments, innumerable pieces of frequency information are present and combine to be mixed up due to numerous surrounding objects and characteristics thereof. Therefore, in order to estimate a length of a target object using a vehicle radar signal, it is necessary to determine the validity of the estimated length.

The present disclosure proposes a vehicle radar in which validity is determined based on shape similarity between frequency spectra using a frequency modulated continuous wave (FMCW) radar and a length of a vehicle is determined if it is determined to be valid, a vehicle radar controlling method, and a vehicle radar controlling system.

FIG. 1 is a diagram illustrating a configuration of a radar according to one embodiment of the present disclosure.

The radar of the present disclosure includes a signal transmitter 110 which transmits a transmission signal for detecting a target object, a signal receiver 120 which receives a reception signal including a target signal generated by the transmission signal being reflected by the target object, and a signal processor 130 which processes the reception signal.

Here, the radar includes a vehicle radar that is disposed in at least one position of a front, a rear, a side, an internal portion, or an external portion of a vehicle. According to one embodiment of the present disclosure, the radar is an FMCW radar. Hereinafter, descriptions will be given focusing on a case in which the radar according to the present disclosure is the FMCW radar. However, the descriptions focusing on the FMCW radar is for convenience of understanding, and the present disclosure may be applied to various types of radars.

The signal transmitter 110 of the radar transmits the transmission signal for detecting the target object, the transmission signal is reflected by objects present in a radiation direction of the transmission signal of the radar, and the reflected signal is received by the signal receiver 120 of the radar. The reception signal includes a target signal generated by reflecting the transmission signal. In one embodiment, the signal transmitter 110 and the signal receiver 120 may be integrally implemented as one signal transceiver, and thus, the signal transceiver may transmit the transmission signal and receive the reception signal.

In one embodiment, a signal transmitted by the signal transmitter 110 is a signal having an up-chirp and down-chirp waveform that is linearly swept over time. As a bandwidth BW of the transmission signal is increased, target detection performance by the signal processor 130 or an ECU may be improved. The signal receiver 120 receives signals reflected by one or more objects (hereinafter, also referred to as targets, target objects, objects, or the like) present in a radiation direction of the transmission signal of the radar. In this case, a signal, in which a time delay by as much as a reciprocating distance between the radar and the object occurs and a frequency shift with respect to a relative velocity of the object occurs, may be received by the signal receiver 120.

The signal processor 130 of the present disclosure detects an object by processing the reception signal received by the signal receiver 120. In one embodiment, a method of detecting an object in the FMCW radar may be a method of detecting peak power using a distance-velocity map for an object and then selecting the object through preset reference power.

In the present embodiment, the signal processor 130 processes the reception signal received by the signal receiver 120 to form a frequency spectrum of the reception signal, determines a window size based on the frequency spectrum of the reception signal, and determines spectrum similarity between an up-chirp frequency and a down-chirp frequency based on the determined window size. If the determined spectrum similarity is greater than a preset threshold value, the signal processor 130 determines a length of a target object.

First, the signal processor 130 of the present disclosure processes the reception signal to form a frequency spectrum of the reception signal.

A difference between a transmission signal radiated by the signal transmitter 110 and the reception signal received by the signal receiver 120 is generated due to a Doppler effect, and accordingly, a beat frequency is generated. In other words, a frequency difference between the transmission signal and the reception signal is referred as a beat frequency. The signal processor 130 performs a fast Fourier transform (FFT) on a beat frequency of the reception signal to form a spectrum for the beat frequency.

In one embodiment, the signal processor 130 of the radar of the present disclosure forms an up-chirp frequency spectrum (also referred to as an up-chirp frequency spectrum or up-chirp spectrum) and a down-chirp frequency spectrum (also referred to as a down-chirp frequency spectrum or down-chirp spectrum) from the reception signal.

In a situation in which an object is present in front of a vehicle equipped with a vehicle radar or in a radiation direction of a transmission signal of a vehicle radar, shapes of an up-chirp spectrum and a down-chirp spectrum of the object are similar. A peak frequency extracted from a spectrum is frequency information including object information. Frequency information about an object is divided into an up-chirp frequency $f_{up}$ and a down-chirp frequency $f_{dn}$ according to an up-chirp period and a down-chirp period. Here, the up-chirp frequency $f_{up}$ is $f_R - f_d$, the down-chirp frequency $f_{dn}$ is $f_R + f_d$, and the up-chirp frequency and the down-chirp frequency differ by twice a Doppler frequency $f_d$. A plurality of peak frequencies may appear from one object, and as a length of the object becomes longer, a plurality of peak frequencies are identified in a wider range.

Figure 2:
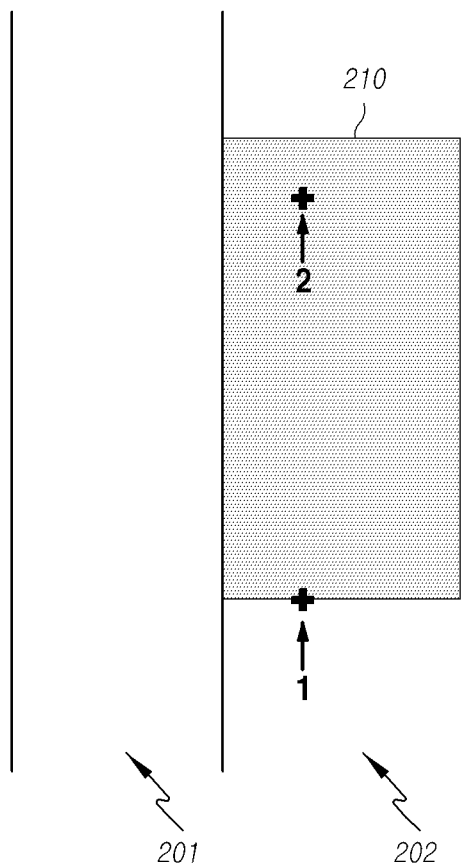
FIG. 2 is a diagram illustrating an object in front of a host vehicle detected by the radar according to one embodiment of the present disclosure.
Figure 3:
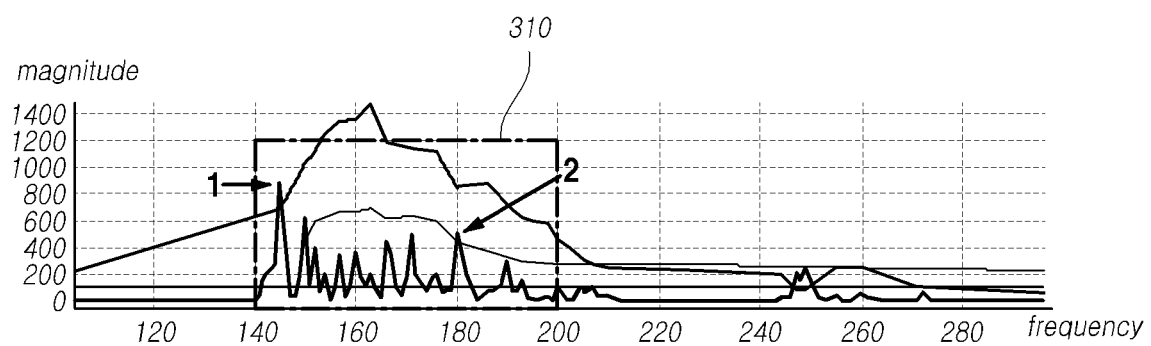
FIGS. 3 and 4 are diagrams illustrating up-chirp and down-chirp frequency spectra formed from a reception signal received by the radar according to one embodiment of the present disclosure.
Figure 4:
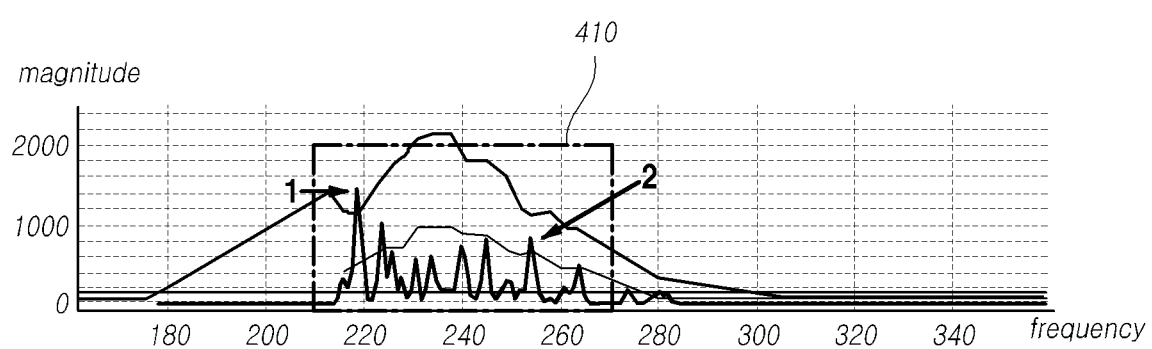

Hereinafter, detailed descriptions will be given with reference to the drawings. FIG. 2 is a diagram illustrating an object in front of a host vehicle detected by the radar according to one embodiment of the present disclosure. FIGS. 3 and 4 are diagrams illustrating up-chirp and down-chirp frequency spectra formed from a reception signal received by the radar according to one embodiment of the present disclosure.

FIG. 2 shows a front direction of the host vehicle. Referring to FIG. 2, the host vehicle is traveling in a lane 201, and a front vehicle (target object) 210 is present in a right lane 202 of the host vehicle. The target object 210 is detected by a radar of the host vehicle. Specifically, the radar radiates a signal and receives a signal reflected by the target object 210 to form a spectrum for the target object 210.

FIG. 3 shows an up-chirp frequency spectrum for the target object, and FIG. 4 shows a down-chirp frequency spectrum for the target object. As can be seen from a box 310 of FIG. 3 and a box 410 of FIG. 4, a shape of the up-chirp spectrum and a shape of the down-chirp spectrum for the target object detected by the radar are similar.

Peak frequencies are detected based on a certain map in each spectrum. A plurality of peak frequencies may be present in one spectrum. A head frequency detected in the up-chirp spectrum is denoted by 2 in FIG. 3, and a tail frequency is denoted by 1 in FIG. 3. Similarly, a head frequency detected in the down-chirp spectrum is denoted by 2 in FIG. 4 and a tail frequency is denoted by 1 in FIG. 4.

A beat up-chirp frequency for a target 1 detected by the radar is as follows:

$$f_{up}^{(1)} = f_R^{(1)} - f_d.$$

A beat down-chirp frequency for the target 1 detected by the radar is as follows:

$$f_{dn}^{(1)} = f_R^{(1)} + f_d.$$

A beat up-chirp frequency for a target 2 detected by the radar is as follows:

$$f_{up}^{(2)} = f_R^{(2)} - f_d.$$

A beat down-chirp frequency for the target 2 detected by the radar is as follows:

$$f_{dn}^{(2)} = f_R^{(2)} + f_d.$$

The signal processor 130 of the present disclosure determines a window size based on the frequency spectrum of the reception signal. A window size indicates an effective spectral range based on information about an object present in front of a vehicle or in a radiation direction of a transmission signal of a vehicle radar, for example, based on waveform information about a signal. A window size indicates a length of a period in which a shape of an up-chirp frequency spectrum and a shape of a down-chirp frequency spectrum for an object are compared with each other.

In one embodiment, the signal processor 130 of the radar of the present disclosure determines a window size using a head frequency and a tail frequency of an up-chirp frequency and a head frequency and a tail frequency of a down-chirp frequency for a target object.

As an example, a window size $L_w$ for an untracked object is as follows:

$$L_w = \lfloor (k_{up}^{(2)} - k_{up}^{(1)} + k_{dn}^{(2)} - k_{dn}^{(2)})/2 \rfloor.$$

Here, $k_{up}^{(2)}$ refers to an up-chirp head frequency, $k_{up}^{(1)}$ refers to an up-chirp tail frequency, $k_{dn}^{(2)}$ refers to a down-chirp head frequency, $k_{dn}^{(1)}$ refers to a down-chirp tail frequency, and symbol $\lfloor \cdot \rfloor$ refers to a greatest integer function.

As another example, a window size $L_w$ for a tracked object is as follows:

$$L_w = \left\lfloor \frac{N(f_{up}^{(h)} - f_{up}^{(t)} + f_{dn}^{(h)} - f_{dn}^{(t)})}{2f_s} \right\rfloor.$$

Here, $f_{up}^{(2)}$ refers to an up-chirp head frequency, $L_T G$) refers to an up-chirp tail frequency, $f_{dn}^{(2)}$ refers to a down-chirp head frequency, $f_{dn}^{(1)}$ refers to a down-chirp tail frequency, N refers to the number of FFT points (for example, 2018, 1014, or the like), $f_s$ refers to a sampling frequency, and symbol $\lfloor \cdot \rfloor$ refers to a greatest integer function.

The signal processor 130 of the present disclosure determines the spectrum similarity between an up-chirp frequency and a down-chirp frequency based on a window size.

Specifically, the signal processor 130 extracts a magnitude spectrum vector of each of the up-chirp frequency and the down-chirp frequency using the window size and determines spectrum similarity based on the extracted magnitude spectrum vectors.

The magnitude spectrum vector of the up-chirp frequency spectrum is expressed as follows:

$$\vec{X}_{up} = [X_{up}[k_{up}^{(1)}] \ldots X_{up}[k_{up}^{(1)} + L_w - 1]].$$

The magnitude spectrum vector of the down-chirp frequency spectrum is expressed as follows:

$$\vec{X}_{dn} = [X_{dn}[k_{dn}^{(1)}] \ldots X_{dn}[k_{dn}^{(1)} + L_w - 1]].$$

A magnitude spectrum vector may be a vector indicating a range spaced from a tail frequency in each frequency spectrum by as much as a window size and may be expressed as a set of single numbers.

The signal processor 130 determines the similarity between an up-chirp spectrum and a down-chirp spectrum based on the extracted magnitude spectrum vectors.

In one embodiment, the signal processor 130 uses a correlation coefficient between the extracted magnitude spectrum vectors as spectrum similarity. A correlation coefficient between a magnitude spectrum vector of an up-chirp frequency spectrum and a magnitude spectrum vector of a down-chirp frequency spectrum is as follows:

$$Corr.Coef.(\vec{X}_{up}, \vec{X}_{dn}) = \frac{\sum_{i=0}^{L_w-1}(X_{up,i} - \mu_{X_{up}})(X_{dn,i} - \mu_{X_{dn}})}{\sqrt{\sum_{i=0}^{L_w-1}(X_{up,i} - \mu_{X_{up}})^2}\sqrt{\sum_{i=0}^{L_w-1}(X_{dn,i} - \mu_{X_{dn}})^2}}.$$

Here, $\mu_{X_{up}}$ refers to an average of magnitude spectrum vectors for an up-chirp frequency, and $\mu_{X_{dn}}$ refers to an average of magnitude spectrum vectors for a down-chirp frequency.

If the spectrum similarity is greater than a preset threshold value, the signal processor 130 determines a length of a target object. The spectrum similarity being greater than a certain value means that an up-chirp frequency spectrum and a down-chirp frequency spectrum contain relatively little noise and thus it is suitable to estimate a length of a target object using the spectra.

In one embodiment, if the spectrum similarity is greater than the preset threshold value, the signal processor 130 determines a length of a target object using the following equation including factors such as a determined window size $L_w$, the light velocity c, and a frequency bandwidth $f_{BW}$:

$$\text{Vehicle length} = \frac{L_w \cdot c}{2f_{BW}}.$$

According to the vehicle radar of the present disclosure, if detection is performed on a length of an object present around a vehicle, the validity of a spectrum according to a received signal is determined in consideration of noise caused by an environment around the vehicle. If it is determined that the validity of the spectrum is greater than a certain range, the spectrum of the signal may be considered valid, and a length of a target object may be determined. Accordingly, accuracy with respect to the length of the target object may be improved.

Figure 5:
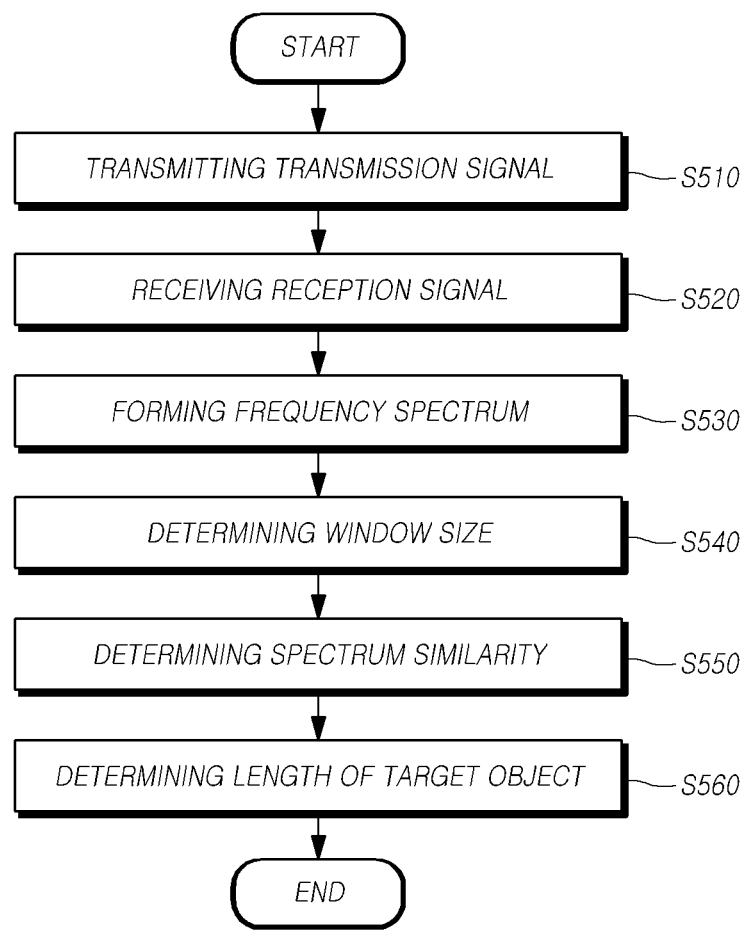
FIG. 5 is a flowchart of a radar controlling method according to one embodiment of the present disclosure.

FIG. 5 is a flowchart of a radar controlling method according to one embodiment of the present disclosure.

The radar controlling method of the present disclosure includes a signal transmitting operation of transmitting a transmission signal for detecting a target object (S510), a signal receiving operation of receiving a reception signal including a target signal generated by the transmission signal being reflected by the target object (S520), a frequency spectrum forming operation of processing the reception signal to form a frequency spectrum of the reception signal (S530), a window size determining operation of determining a window size based on the frequency spectrum of the reception signal (S540), a spectrum similarity determining operation of determining spectrum similarity between an up-chirp frequency and a down-chirp frequency based on the window size (S550), and an object length determining operation of, if the spectrum similarity is greater than a preset threshold value, determining a length of the target object (S560).

The signal transmitting operation may be performed by a signal transmitter of a radar, and the signal receiving operation may be performed by a signal receiver of the radar. Alternatively, the signal transmitting operation and the signal receiving operation may be performed by one transceiver in which the signal transmitter and the signal receiver are integrated. The frequency spectrum forming operation, the window size determining operation, the spectrum similarity determining operation, and the object length determining operation may be performed by a signal processor of the radar. For reference, the descriptions of the implementation of the signal transmitter, the signal receiver, and the signal processor of the above-described radar may be referenced for each operation of the radar controlling method.

Here, the radar may include a vehicle radar disposed in at least one position of a front, a rear, a side, an internal portion, or an external portion of a vehicle, and a type of the radar may be, for example, an FMCW radar. Hereinafter, descriptions will be given focusing on a case in which the radar according to the present disclosure is the FMCW radar. However, the descriptions focusing on the FMCW radar is for convenience of understanding, and the present disclosure may be applied to various types of radars.

In one embodiment, a transmission signal is a signal having an up-chirp and down-chirp waveform that is linearly swept over time. As a bandwidth BW of the transmission signal is increased, target detection performance by the signal processor or an ECU may be improved. Signals reflected by one or more objects (hereinafter, also referred to as targets, target objects, objects, or the like) present in a radiation direction of the transmission signal of the radar are received. In this case, the signals include a signal in which a time delay by as much as a reciprocating distance between the radar and the object occurs and a frequency shift with respect to a relative velocity of the object occurs.

First, the radar processes the reception signal to form a frequency spectrum of the reception signal. A difference between the transmission signal and the reception signal is generated due to a Doppler effect, and accordingly, a beat frequency is generated. The radar performs an FFT on a beat frequency of the reception signal to form a spectrum for the beat frequency.

In one embodiment, the radar of the present disclosure forms an up-chirp frequency spectrum (also referred to as an up-chirp frequency spectrum or up-chirp spectrum) and a down-chirp frequency spectrum (also referred to as a down-chirp frequency spectrum or down-chirp spectrum) from the reception signal. In a situation in which an object is present in front of a vehicle equipped with a vehicle radar or in a radiation direction of a transmission signal of the vehicle radar, shapes of an up-chirp spectrum and a down-chirp spectrum of the object are similar. A peak frequency extracted from a spectrum is frequency information including object information. A plurality of peak frequencies may appear from one object, and as a length of the object becomes longer, a plurality of peak frequencies are identified in a wider range.

The radar of the present disclosure determines a window size based on a frequency spectrum of the reception signal. A window size indicates an effective spectral range based on information about an object present in front of a vehicle or in a radiation direction of a transmission signal of a vehicle radar, for example, based on waveform information about a signal. The window size indicates a length of a period in which a shape of an up-chirp frequency spectrum and a shape of a down-chirp frequency spectrum for an object are compared with each other.

In one embodiment, the radar of the present disclosure determines a window size using a head frequency and a tail frequency of an up-chirp frequency and a head frequency and a tail frequency of a down-chirp frequency for a target object.

As an example, a window size $L_w$ for an untracked object is as follows:

$$L_w = \lfloor (k_{up}^{(2)} - k_{up}^{(1)} + k_{dn}^{(2)} - k_{dn}^{(1)})/2 \rfloor.$$

Here, $k_{up}^{(2)}$ refers to an up-chirp head frequency, $k_{up}^{(1)}$ refers to an up-chirp tail frequency, $k_{dn}^{(2)}$ refers to a down-chirp head frequency, $k_{dn}^{(1)}$ refers to a down-chirp tail frequency, and symbol refers to a greatest integer function.

As another example, a window size $L_w$ for a tracked object is as follows:

$$L_w = \left\lfloor \frac{N(f_{up}^{(h)} - f_{up}^{(t)} + f_{dn}^{(h)} - f_{dn}^{(t)})}{2f_s} \right\rfloor.$$

Here, $f_{up}^{(2)}$ refers to an up-chirp head frequency, $L_{up}^{(1)}$ refers to an up-chirp tail frequency, $f_{dn}^{(2)}$ refers to a down-chirp head frequency, $f_{dn}^{(1)}$ refers to a down-chirp tail frequency, N refers to the number of FFT points (for example, 2018, 1014, or the like), $f_s$ refers to a sampling frequency, and symbol $\lfloor \cdot \rfloor$ refers to a greatest integer function.

The radar of the present disclosure determines spectrum similarity between an up-chirp frequency and a down-chirp frequency based on the window size.

Specifically, the radar extracts a magnitude spectrum vector of each of the up-chirp frequency and the down-chirp frequency using the window size and determines spectrum similarity based on the extracted magnitude spectrum vectors.

The magnitude spectrum vector of the up-chirp frequency spectrum is expressed as follows:

$$\vec{X_{up}} = [X_{up}[k_{up}^{(1)}] \ldots X_{up}[k_{up}^{(1)} + L_w - 1]].$$

The magnitude spectrum vector of the down-chirp frequency spectrum is expressed as follows:

$$\vec{X_{dn}} = [X_{dn}[k_{dn}^{(1)}] \ldots X_{dn}[k_{dn}^{(1)} + L_w - 1]].$$

A magnitude spectrum vector may be a vector indicating a range spaced from a tail frequency in each frequency spectrum by as much as a window size and may be expressed as a set of single numbers.

The radar determines similarity between an up-chirp spectrum and a down-chirp spectrum based on the extracted magnitude spectrum vectors.

In one embodiment, the radar uses a correlation coefficient between the extracted magnitude spectrum vectors as spectrum similarity. A correlation coefficient between a magnitude spectrum vector of an up-chirp frequency spectrum and a magnitude spectrum vector of a down-chirp frequency spectrum is as follows:

$$Corr.Coef.(\vec{X_{up}}, \vec{X_{dn}}) = \frac{\sum_{i=0}^{L_w - 1} (X_{up,i} - \mu_{X_{up}})(X_{dn,i} - \mu_{X_{dn}})}{\sqrt{\sum_{i=0}^{L_w - 1} (X_{up,i} - \mu_{X_{up}})^2} \sqrt{\sum_{i=0}^{L_w - 1} (X_{dn,i} - \mu_{X_{dn}})^2}}.$$

Here, $\mu_{X_{up}}$ refers to an average of magnitude spectrum vectors for an up-chirp frequency, and $\mu_{X_{dn}}$ refers to an average of magnitude spectrum vectors for a down-chirp frequency.

If the spectrum similarity is greater than a preset threshold value, the radar determines a length of a target object. The spectrum similarity being greater than a certain value means that an up-chirp frequency spectrum and a down-chirp frequency spectrum contain relatively little noise and thus it is suitable to estimate a length of a target object using the spectra.

In one embodiment, if the spectrum similarity is greater than the preset threshold value, the radar determines a length of a target object using the following equation including factors such as a determined window size $L_w$, the light velocity c, and a frequency bandwidth $f_{BW}$:

$$\text{Vehicle length} = \frac{L_w \cdot c}{2 f_{BW}}.$$

According to the vehicle radar controlling method of the present disclosure, if detection is performed on a length of an object present around a vehicle, the validity of a spectrum according to a reception signal is determined in consideration of noise caused by an environment around the vehicle. If it is determined that the validity of the spectrum is greater than a certain range, the spectrum of the signal may be considered valid, and a length of a target object may be determined. Accordingly, accuracy with respect to the length of the target object may be improved.

Figure 6:
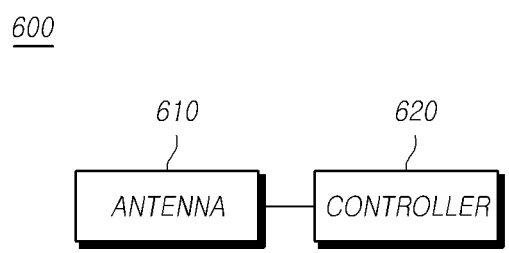
FIG. 6 is a diagram illustrating a configuration of a radar controlling system according to one embodiment of the present disclosure.

FIG. 6 is a diagram illustrating a configuration of a radar controlling system according to one embodiment of the present disclosure.

A radar controlling system 600 of the present disclosure includes at least one antenna 610 which transmits a transmission signal for detecting a target object and receives a reception signal including a target signal generated by the transmission signal being reflected by the target object and a controller 620 which processes at least one of the transmission signal or the reception signal.

Specifically, the controller 620 processes the reception signal to form a frequency spectrum of the reception signal, determines a window size based on the frequency spectrum of the reception signal, and determines spectrum similarity between an up-chirp frequency and a down-chirp frequency based on the determined window size. If the determined spectrum similarity is greater than a preset threshold value, the controller 620 determines a length of the target object.

The at least one antenna of the radar controlling system is a component corresponding to a signal transmitter and/or a signal receiver of a radar, and the controller of the radar controlling system is a component corresponding to a signal processor of the radar. Therefore, the descriptions of the signal transmitter, the signal receiver, and the signal processor of the radar may be referenced for detailed descriptions of the at least one antenna and the controller, and thus, detailed descriptions thereof herein will not be given again.

As described above, according to the present disclosure, since validity is determined based on frequency spectrum similarity, a degree of noise in signal information detected by a vehicle radar can be grasped, and accuracy with respect to a length of a target object can be improved. Furthermore, since the length of the target object is determined only if it is determined that information is valid, calculation complexity can be reduced.

The above-described terms "system," "processor," "controller," "component," "module," "interface," "model," and "unit" may generally refer to computer-related entity hardware, a combination of hardware and software, software, or running software. For example, the above-described component may be a process driven by a processor, a processor, a controller, a control processor, an object, a thread of execution, a program, and/or a computer but is not limited thereto. For example, all of an application running on a controller or a processor, the controller, and the processor can be a component. One or more components can present in a process and/or thread of execution and a component can be positioned in one system and/or distributed between two or more systems.

The above-described "comprise," "configure," and/or "have" specify the presence of corresponding components, and unless otherwise stated herein, do not preclude the presence thereof and should be construed to further include other components. Unless otherwise defined, all terms including technical or scientific terms used herein have the same meaning as commonly understood by those skilled in the art to which the present disclosure pertains. General terms like those defined in a dictionary shall be construed to have meanings that are consistent in the context of the relevant art, and will not be interpreted as having an idealistic or excessively formalistic meaning unless clearly defined in the present disclosure.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A frequency modulated continuous wave (FMCW) radar comprising:
a signal transmitter which transmits a transmission signal for detecting a target object;
a signal receiver which receives a reception signal including a target signal generated by the transmission signal being reflected by the target object; and
a signal processor which processes the reception signal to form a frequency spectrum of the reception signal,
wherein the signal processor determines a window size based on the frequency spectrum of the reception signal, determines spectrum similarity between an up-chirp frequency and a down-chirp frequency based on the determined window size, and determines a length of the target object if the spectrum similarity is greater than a preset threshold value, and
wherein the signal processor forms an up-chirp frequency spectrum and a down-chirp frequency spectrum from the reception signal and determines the window size using a head frequency and a tail frequency of the up-chirp frequency and a head frequency and a tail frequency of the down-chirp frequency.

2. The FMCW radar of claim 1, wherein the signal processor extracts a magnitude spectrum vector of each of the up-chirp frequency and the down-chirp frequency using the window size and determines the spectrum similarity based on the extracted magnitude spectrum vectors.

3. The FMCW radar of claim 2, wherein the signal processor uses a correlation coefficient between the extracted magnitude spectrum vectors as the spectrum similarity.

4. The FMCW radar of claim 1, wherein, if the spectrum similarity is greater than the preset threshold value, the signal processor determines the length of the target object using factors such as the determined window size, a light velocity, and a frequency bandwidth.

5. A frequency modulated continuous wave (FMCW) radar controlling method comprising:
transmitting a transmission signal for detecting a target object;
receiving a reception signal including a target signal generated by the transmission signal being reflected by the target object;
forming a frequency spectrum of the reception signal by processing the reception signal;
determining a window size based on the frequency spectrum of the reception signal;
determining spectrum similarity between an up-chirp frequency and a down-chirp frequency based on the window size; and
determining a length of the target object if the spectrum similarity is greater than a preset threshold value,
wherein the forming the frequency spectrum comprises forming an up-chirp frequency spectrum and a down-chirp frequency spectrum from the reception signal, and
wherein the determining the window size comprises determining the window size using a head frequency and a tail frequency of the up-chirp frequency and a head frequency and a tail frequency of the down-chirp frequency.

6. The FMCW radar controlling method of claim 5, wherein the determining spectrum similarity comprises extracting a magnitude spectrum vector of each of the up-chirp frequency and the down-chirp frequency using the window size, and determining the spectrum similarity based on the extracted magnitude spectrum vectors.

7. The FMCW radar controlling method of claim 6, wherein the determining spectrum similarity comprises using a correlation coefficient between the extracted magnitude spectrum vectors as the spectrum similarity.

8. The FMCW radar controlling method of claim 5, wherein the determining a length of the target object comprises, if the spectrum similarity is greater than the preset threshold value, determining the length of the target object based on the window size.

9. A frequency modulated continuous wave (FMCW) radar controlling system comprising:
at least one antenna which transmits a transmission signal for detecting a target object and receives a reception signal including a target signal generated by the transmission signal being reflected by the target object; and
a controller which processes at least one of the transmission signal or the reception signal,
wherein the controller processes the reception signal to form a frequency spectrum of the reception signal, determines a window size based on the frequency spectrum of the reception signal, determines spectrum similarity between an up-chirp frequency and a down-chirp frequency based on the determined window size, and determines a length of the target object if the spectrum similarity is greater than a preset threshold value, and
wherein the signal processor forms an up-chirp frequency spectrum and a down-chirp frequency spectrum from the reception signal and determines the window size using a head frequency and a tail frequency of the up-chirp frequency and a head frequency and a tail frequency of the down-chirp frequency.

* * * * *